United States Patent [19]

Braun et al.

[11] 4,003,190

[45] Jan. 18, 1977

[54] SAFETY DEVICE FOR WALK-BEHIND ROTARY MOWERS

[75] Inventors: Daniel E. Braun, Brookfield; Joseph R. Harkness, Germantown, both of Wis.

[73] Assignee: Briggs & Stratton Corporation, Wauwatosa, Wis.

[22] Filed: Aug. 7, 1975

[21] Appl. No.: 602,815

[52] U.S. Cl. ................................ 56/10.5; 56/17.5; 123/179 K; 123/179 SE; 123/185 A

[51] Int. Cl.² .................. A01D 53/00; F02N 11/08

[58] Field of Search ............... 56/10.5, 11.3, 17.5, 56/320.1, 320.2; 172/42; 123/179 R, 179 K, 199 SE, 185 R, 185 A, 185 B, 185 BA

[56] References Cited

UNITED STATES PATENTS

| 2,736,153 | 2/1956 | Dunn | 56/10.5 |
|---|---|---|---|
| 2,973,613 | 3/1961 | Hagedorn | 56/10.5 |
| 3,142,950 | 8/1964 | West | 56/10.5 |
| 3,229,452 | 1/1966 | Hasenbank | 56/10.5 |
| 3,718,128 | 2/1973 | Botker | 123/179 K |
| 3,750,378 | 8/1973 | Thorud et al. | 56/10.5 |
| 3,782,084 | 1/1974 | Harkness | 56/10.5 |

*Primary Examiner*—Russell R. Kinsey
*Attorney, Agent, or Firm*—Ira Milton Jones

[57] ABSTRACT

In a walk-behind rotary lawn mower powered by a gasoline engine, two pushbutton-type switches are so connected in the engine ignition circuit that at least one must be actuated for the engine to run. One switch comprises a dead-man control actuated by gripping the mower guide handle. The other is actuated by a treadle so located on the mower deck as to be depressed by one foot of a person who has his other foot in a safe position and who is operating the engine rope starter in a natural, convenient manner. Depression of the treadle also actuates a brake that prevents the mower from rolling.

7 Claims, 6 Drawing Figures

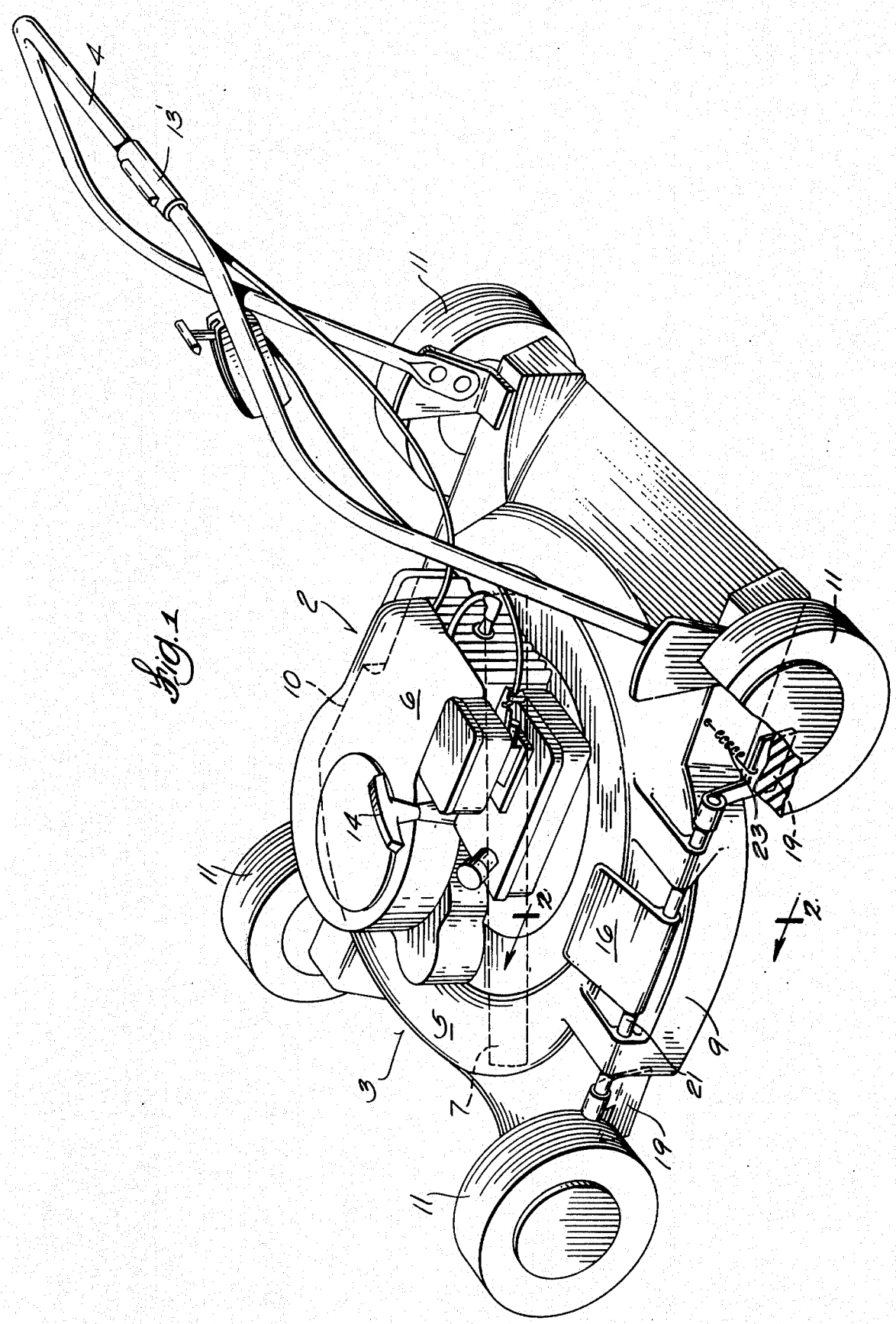

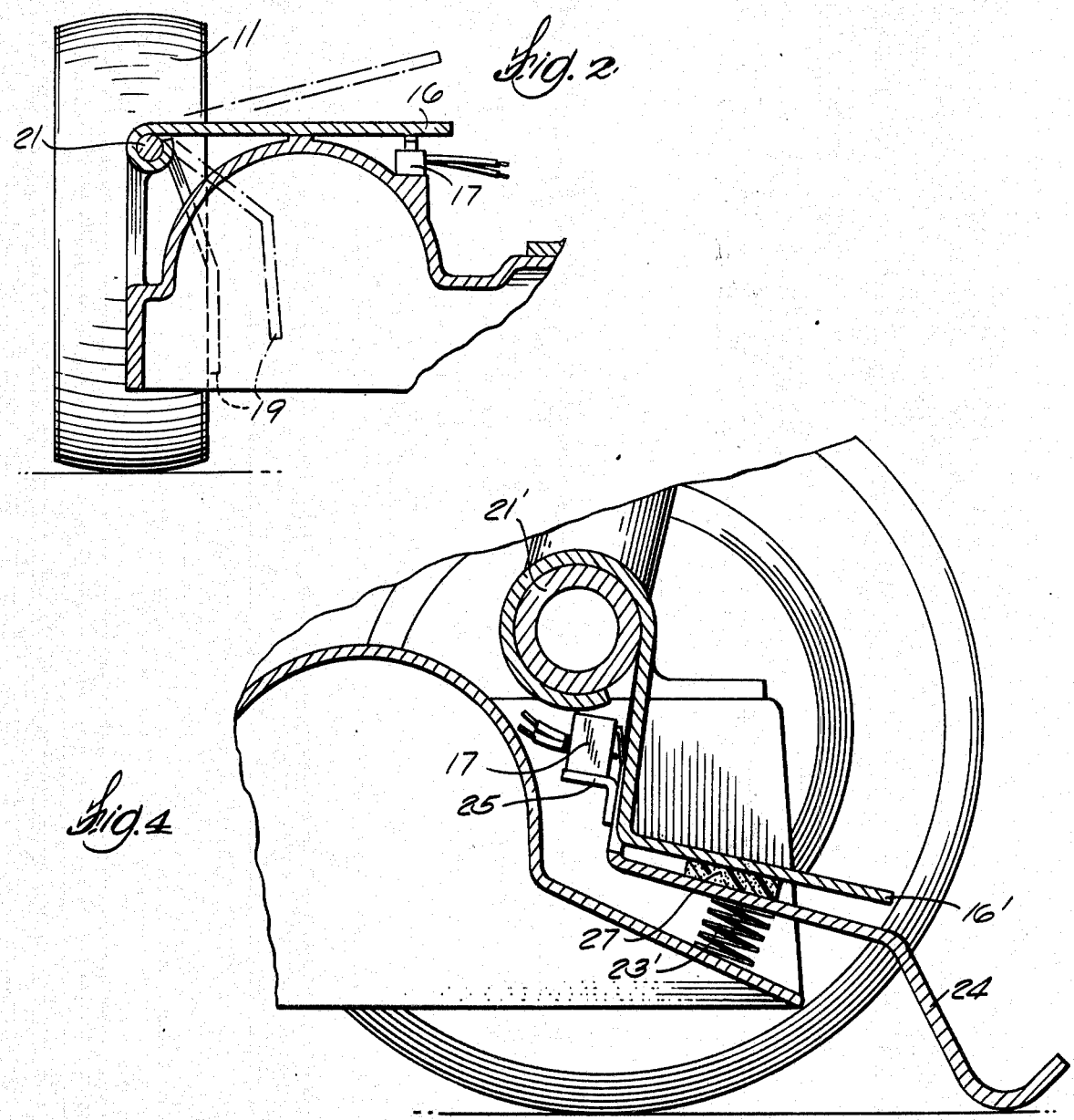
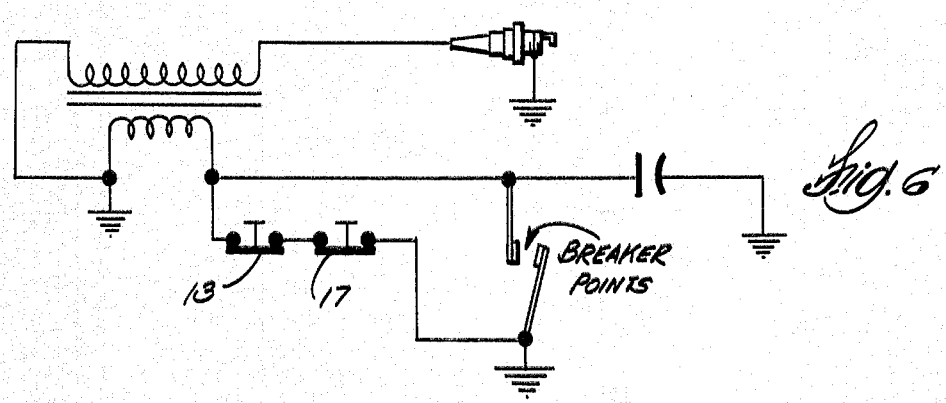

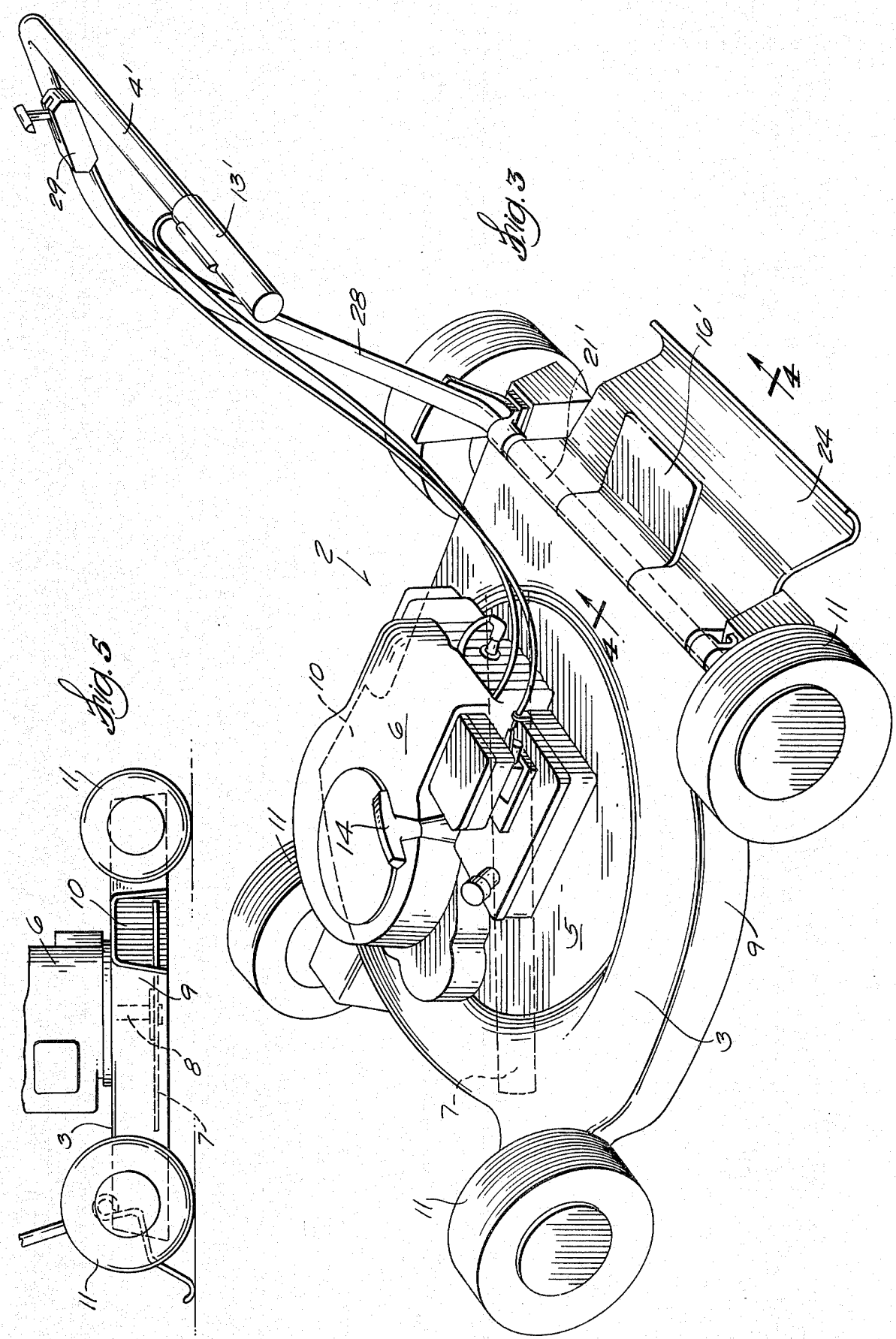

SAFETY DEVICE FOR WALK-BEHIND ROTARY MOWERS

This invention relates to safety devices for lawn mowers powered by internal combustion engines, and is more particularly concerned with means for constraining the operator of a walk-behind power lawn mower to follow safe practices in starting its engine and using the mower.

The popular rotary power lawn mower that has a blade rotating on a vertical axis is not an inherently dangerous machine, but, like an automobile, it can inflict very serious injury upon one who does not exercise due care in using it. The manufacturers of such lawn mowers and of the engines that power them have been conscious for many years of the need for so designing their products as to eliminate safety hazards from the machines themselves and minimize the care that must be exercised in operating them. It is probable that the public is not aware of the extent of these efforts, nor of the fact that the industry has for some time operated under a rather stringent self-imposed safety code which ensures that a modern mower is virtually incapable of causing injury if it is properly handled.

However, proper handling of the mower is the key consideration. Unfortunately, it is an all too familiar fact that mere instructions and warnings are not enough to prevent carelessness. The present invention is premised upon a recognition that a machine will sometimes be operated unsafely unless it is so designed that unsafe operation of it is practically impossible.

Experience has shown that when any machine is equipped with a safety feature that tends to interfere with the efficiency, convenience or comfort of its operator, at least some users of the machine will soon find a way to avoid the annoyance created by the safety feature — almost invariably by defeating the safety feature itself.

With these important facts well in mind, it is the general object of the present invention to provide means in a walk-behind rotary power lawn mower for compelling the operator thereof to follow safe but comfortable and efficient operating procedures in starting its engine and using the mower, and which achieve this objective by simply preventing the operator from engaging in unsafe practices.

On a modern walk-behind rotary power mower, the rotating blade is almost completely enclosed by a skirted deck, but the bottom edge of the skirt must have a small clearance above the ground, and there must be an opening at one side of the skirt that provides a clipping outlet through which cut grass is discharged. The clipping discharge outlet is undoubtedly the zone of principal concern from a safety standpoint because it is large enough to admit a person's foot, and the insertion of a foot into it can result from a mere lapse of attention. Insertion of a hand into that outlet or under the skirt when the engine is running requires a conscious act that an ordinarily prudent person should recognize as an invitation to serious injury, but it is nevertheless desirable to prevent even those accidents that would be due to gross negligence if their prevention can be achieved without inconvenience.

Hence, it is another general object of this invention to provide means on a power lawn mower for markedly increasing the safety thereof by making it all but impossible for an operator of the mower to insert either a hand or a foot into its clipping outlet or under its skirt when the engine is running, but which does not interfere in any manner with normal operation of the mower or in anywise compromise with convenience or efficiency.

The possibility of an inadvertent insertion of the foot into the clipping discharge outlet is of principal concern in connection with manual starting of the engine of a rotary lawn mower, when the operator is concentrating upon the engine and tends to assume whatever position will enable him to exert the necessary cranking force without discomfort. It is therefore a primary objective of the present invention to require the operator to start the engine from a position in which he is completely comfortable but in which he cannot bring either of his feet near the discharge outlet.

Since the clipping discharge outlet is near the front of the mower, and an operator of a walk-behind mower normally guides it in use by means of a handle that projects rearwardly and upwardly from its deck, the obvious expedient for keeping the operator well away from the clipping outlet during engine starting would be to require that starting be effected from a position behind the guide handle. With this in mind, experiments were made with a rotary mower powered by an engine having a pull-rope rewind starter on which a lengthened pull rope was installed. The T-handle of the pull rope was mounted on the guide handle of the mower, adjacent to the normal position of the engine control instrumentality. Although the engine used with this installation was equipped with a popular compression relief expedient that made for very low starting torque, most persons who tried the arrangement found it inconvenient because only the arm muscles could be used to apply starting energy, and those muscles are not well adapted for effecting a long pulling stroke against constantly varying resistance. With the more conventional arrangement, wherein the pull rope T-handle is located on top of the engine and must be reached from a slightly stooping position, the back and leg muscles can be used in cooperation with the arm muscles, and starting the engine with a pull rope is much more convenient and less fatiguing.

Having in mind the lessons learned from this experiment, it is another object of the present invention to provide a safety device for walk-behind power lawn mowers whereby an operator who cranks the mower engine with a pull rope starter is constrained to occupy a safe position in which both of his feet are spaced well away from the blade but in which he is nevertheless capable of working the starter in an altogether natural and convenient manner, and whereby assurance is had that the mower will not move in any direction while its engine is being cranked.

From what has just been said it will be apparent that it is another and very important object of this invention to provide a rotary power lawn mower that does not constitute a source of danger to small children.

With these observations and objectives in mind, the manner in which the invention achieves its purposes will be appreciated from the following description and the accompanying drawings, which exemplify the invention, it being understood that changes may be made in the specific apparatus disclosed herein without departing from the essentials of the invention set forth in the appended claims.

The accompanying drawings illustrate two complete examples of the embodiments of the invention constructed according to the best modes so far devised for the practical application of the principles thereof, and in which:

FIG. 1 is a perspective view, with portions shown broken away, of a walk-behind rotary lawn mower powered by a manually started engine, which mower embodies the principles of this invention;

FIG. 2 is an enlarged vertical sectional view taken on the plane of the line 2—2 in FIG. 1;

FIG. 3 is a perspective view of a lawn mower generally similar to that illustrated in FIG. 1 but embodying the invention in a modified form;

FIG. 4 is an enlarged vertical sectional view taken on the plane of the line 4—4 in FIG. 3;

FIG. 5 is a side view, on a smaller scale, of the lawn mower shown in FIG. 3, viewing the same from the side of the machine opposite to that seen in FIG. 3; and FIG. 6 is a circuit diagram illustrating how the switches in an embodiment of the present invention are connected in the ignition circuit of a lawn mower engine.

Referring now to the accompanying drawings, the numeral 2 designates generally a walk-behind rotary power lawn mower that comprises a wheeled carriage 3 and a guide handle 4. The carriage has a deck 5 on which is mounted a gasoline engine 6 that drives a blade or cutting element 7 for rotation on a vertical axis. As is generally conventional, the crankshaft 8 (indicated in FIG. 5) of the engine projects downwardly through the deck, and has the blade 7 secured directly to its lower end.

The carriage further comprises a circumferential skirt 9 that depends from the deck. The deck and skirt almost completely enclose the blade, but the skirt has a clipping discharge outlet 10 at one side of the mower, near its front. Wheels 11 on the carriage support it for movement over the ground, and the mower is guided for such movement by means of the rearwardly and upwardly projecting handle 4.

If the mower is of the self-propelled type, at least two of the wheels will have a power transmitting connection with the engine, but the operativeness of that transmission will preferably be controlled by a dead-man safety arrangement whereby the wheels are coupled to the engine only when an operator is gripping the handle 4 to guide the mower in its self-propelled motion, the wheels being otherwise freely rotatable. Details of the self-propelling mechanism and its deadman control are not shown, inasmuch as these are thoroughly familiar. Instead, the mower is here illustrated as being of the hand-pushed type, wherein the wheels 11 are freely rotatable and undriven and the handle 4 serves for propulsion as well as for guidance.

In the present case the engine has an electrical ignition system, and a switch 13 that is connected in the ignition — see FIG. 6 — is so mounted on the guide handle 4 as to be actuatable by a deadman control 13' whereby the ignition system tends to be disabled whenever the operator of the mower releases his grip on the guide handle. It will be understood that the switch 13 has two conditions and that it is biased towards one of them and is actuated to the other by an operator clasping the guide handle and the deadman control 13'. It will also be understood that the switch has a rather large actuator which is so arranged that an operator almost inevitably maintains the switch in its engine running condition so long as he is gripping the guide handle 4; and hence the switch 13 demands no attention or effort on the part of the operator.

The engine 6 is equipped with a conventional manually actuated rope-rewind starter comprising a T-handle 14 that is accessible at the top of the engine, near the side thereof remote from the clipping discharge outlet 10. The engine is started by a generally upward pull on the T-handle.

A person bending over the engine to pull the starting rope instinctively tends to place one foot forward of the other to brace himself for the upward pull, and usually wants to place the forward foot on the mower deck to prevent the mower from being lifted by the force of the pull and to steady the mower against rolling. The present invention encourages him to assume this natural and comfortable position and compels him to position himself away from the clipping discharge outlet and close to the guide handle.

According to the present invention, the mower is equipped with a treadle or foot pad 16 that is mounted on its carriage near the starter T-handle, at a location well spaced from the clipping discharge outlet, and the operator is effectively compelled to place one foot on the treadle for starting the engine. As shown in FIG. 1, wherein the clipping discharge outlet 10 is at the right-hand side of the mower, the T-handle 14 is located at the left-hand side of the engine and the foot pad 16 overlies the left-hand marginal edge portion of the deck, midway between the left front and left rear wheels. Since the clipping outlet is almost invariably located near the front of the mower, another suitable location for the treadle is at the rear of the deck, as illustrated in FIG. 3, although in that case a somewhat unconventional guide handle arrangement is desirable, as explained below.

In any case, the treadle or foot pad 16 is mounted for limited up and down motion and is biased to a slightly raised position. Operatively associated with the treadle is a two-condition electric switch 17 that is normally in one of its conditions but is actuated to its other condition by depression of the treadle. Like the dead-man control switch 13 on the guide handle, the switch 17 that is associated with the treadle is so connected with the ignition system that the switch must be in its actuated condition for the ignition system to be operative. This is to say that the engine cannot be started unless at least one of the two switches 13 and 17 is actuated. Therefore the only convenient way for the operator to start the engine is for him to place a foot on the treadle, and in so doing he automatically and necessarily positions himself to avoid an encounter with the blade. Theoretically, of course, the engine could be started without depression of the treadle if the operator, instead, maintained a grip on the dead-man control on the guide handle; but starting the engine in that manner would be awkward, and even if it were to be done, the operator would still have to maintain a position well away from the clipping outlet in order to be successful.

As a matter of further convenience and safety, the treadle 16 is connected with brake means 19 which is rendered operative by depression of the treadle and which then serves to prevent the mower from rolling. The brake means 19 is of course inoperative whenever the treadle is in its raised position, so that the presence of the brake means does not interfere with normal use of the mower.

As shown in FIG. 1, the brake means 19 can take the form of brake members engageable with wheels on the mower to hold them against rotation. In that case the treadle is secured to the medial portion of a fore-and-aft extending shaft 21 that is rotatably mounted on the left side of the mower deck, and the brake means comprises L-shaped brake members secured to the end portions of the shaft near the left front and left rear wheels, to be frictionally engageable with the inner side surfaces of those wheels. A tension spring 23, connected between the skirt portion of the deck and one of the L-shaped members, biases the brake members away from engagement with the wheels and concomitantly biases the treadle to its raised position.

As shown in FIG. 6, each of the switches 13 and 17 can be a normally closed pushbutton switch, and the two switches are connected in series with one another in a grounding circuit for the engine magneto. The magneto is of course rendered inoperative by grounding or short circuiting its primary winding. Since the two switches are connected in series, the grounding connection is broken by opening either one of them, and therefore the engine can run only so long as at least one of them is held open.

With the illustrated arrangement, an operator starts the engine with his foot on the treadle to hold the switch 17 open, and when the engine is running he can easily reach over to the guide handle 4 and grip the dead-man control 13' to open the switch 13. Once the switch 13 is actuated, the operator can remove his foot from the treadle, and the engine will continue to run. A very short interval between release of the treadle and gripping of the handle 4 and deadman control 13' will not result in any inconvenience, since the engine will coast through a few unfired strokes.

If the operator believes that he has occasion to probe into the clipping discharge outlet or to turn the mower over, the engine will stop as soon as he releases his grip on the guiding handle with a view to carrying out such intentions; hence he will not be struck by the rotating blade even if his actions would have been grossly negligent with a heretofore conventional mower. If the operator is merely going to walk away from the mower, stopping of the engine upon release of the guide handle assures that he cannot be struck by any object that might be picked up by the rotating blade and thrown out of the discharge outlet. It will also be apparent that a mower having the safety features of this invention is not likely to cause injuries to small children because the mower cannot be left unattended with its engine running, and a small child who succeeds in starting its engine and keeping it running will be out of the way of its blade.

In the modified embodiment of the invention illustrated in FIG. 3, wherein the treadle or foot pad 16 is mounted at the rear of the carriage, the brake means 19 comprises a drag plate 24 that extends across most of the width of the carriage. The brake means and the treadle are both carried on a horizontal shaft 21' that extends across the rear of the carriage, between the two rear wheels, and they are swingable about that shaft relative to one another. The drag plate is biased to a raised position in which its lower edge is clear of the ground, such biasing being effected by means of a spring 23' that reacts between the drag plate and the carriage. The switch 17 that is actuated by the treadle can again be a normally-closed pushbutton switch. It is mounted on the drag plate, as by means of a bracket 25, to have its pushbutton engaged by the treadle, but it is normally maintained in its closed condition by reason of the treadle being biased upwardly relative to the drag plate. As shown, the means for imparting such lifting bias to the treadle comprises a resilient sponge rubber pad 27 confined between the treadle and the drag plate. Stepping on the treadle of course opens the switch 17 to allow the engine to run and simultaneously engages the lower edge of the drag plate against the ground so that the drag plate frictionally restrains the mower against movement.

With the treadle located at the rear of the carriage, a guide handle mounted on the carriage symmetrically to its longitudinal centerline would tend to block access to the treadle, and important objectives of the invention would not be achieved. To prevent this, the guide handle 4' in the FIG. 3 embodiment has an asymmetrical connection to the carriage. In that case, the guide handle comprises a single piece of stiff and sturdy tubing formed to a U-shape and having one leg that is connected with the carriage and provides the shaft 21' on which the treadle and drag plate are mounted, while its other leg forms the handle 4' proper on which the dead-man control 13' and an engine speed control 29 are mounted. The bright portion 28 of that U-shaped member extends upwardly and rearwardly from the carriage at the clipping discharge side thereof and thus blocks access to the treadle from the dangerous side of the mower. A righthanded person can face away from the upright member 28 while pulling the starter rope T-handle 14; a lefthanded person can face towards it. In either case, the hand not used for pulling the rope can readily be placed on the guide handle to actuate the switch 13 as soon as the engine starts.

From the foregoing description taken with the accompanying drawings, it will be apparent that this invention provides means for constraining the operator of a walk-behind rotary power lawn mower to follow safe practices in the starting and operation of the machine, but allows him to do so while following procedures that are natural and convenient. It will also be apparent that the apparatus of this invention is low in cost and that it lends itself to incorporation in heretofore existing lawn mower models without requiring extensive modification or design changes therein.

Those skilled in the art will appreciate that the invention can be embodied in forms other than as herein disclosed for purposes of illustration.

The invention is defined by the following claims

We claim:

1. In a walk-behind power lawn mower comprising a carriage mounted on wheels, an internal combustion engine on the carriage that has a manually energized starter and an electrical ignition system, a cutting element beneath the carriage that is driven for rotation by the engine, a skirt on the carriage that substantially surrounds the cutting element but has a clipping discharge outlet through which the cutting element can be contacted when it is rotating, and a guide handle projecting rearwardly and upwardly from the carriage for guiding the mower across the ground, safety means for preventing contact with the rotating cutting element by a person who starts the engine and uses the mower, said safety means comprising:

A. a treadle mounted on the carriage at a location adjacent to the skirt but remote from its discharge outlet, said treadle being biased to a raised position and being arranged to be depressed by one foot of a person who has his other foot well spaced from said discharge outlet and who is in a position for starting the engine;

B. a first electric switch connected with said treadle to be actuated thereby and which has one condition when the treadle is in its raised position and an opposite condition when the treadle is depressed;

C. a second electric switch located at said handle and arranged to have one condition when the handle is not being gripped and an opposite condition when the handle is gripped; and D. conductor means so connecting said switches with one another and in the engine ignition system that the ignition system is disabled unless at least one of said switches is in its said opposite condition.

2. The power lawn mower of claim 1, wherein said safety means further comprises:

brake means connected with the treadle, rendered operative by depression of the treadle to inhibit motion of the mower over the ground and rendered inoperative by motion of the treadle to its raised position.

3. The power lawn mower of claim 2, wherein said clipping discharge outlet is at one side of the carriage, the treadle is mounted at the other side of the carriage, and said brake means comprises members engageable with the wheels at said other side of the carriage to prevent them from rotating.

4. The power lawn mower of claim 2, wherein the brake means comprises a drag element that is swingable downwardly to engage the ground upon depression of the treadle.

5. The power lawn mower of claim 4 wherein said clipping discharge outlet is located at one side of the carriage and said treadle is located at the rear of the carriage, further characterized by:

said handle being asymmetrically connected with the carriage by means of an elongated member which extends rearwardly from the carriage at said one side thereof and which thus tends to obstruct engine starting from said one side of the carriage.

6. In a walk-behind power lawn mower comprising a wheeled carriage and a cutting element which is relatively accessible at one portion of the carriage and which is rotatably driven by an internal combustion engine that must be manually started from a position near the carriage and remote from a handle by which the carriage is guided for movement over the ground, safety means for preventing an operator from coming into inadvertent contact with the cutting element during starting of the engine, said safety means comprising:

A. a treadle mounted on the carriage for up and down movement and biased to a raised position, said treadle being at a location remote from said one portion of the carriage and such that a person having one foot on the treadle to depress it and who is in a position for convenient manual starting of the engine will normally have both feet well clear of the cutting element;

B. brake means movable to and from an operative position preventing movement of the mower over the ground and biased away from its operative position;

C. means so connecting the treadle with said brake means that depression of the treadle moves the brake means to its operative position and release of the treadle permits the brake means to move out of its operative position; and D. means operatively connected with the treadle and with the engine for preventing starting of the engine when the treadle is in its raised position.

7. The power lawn mower of claim 6 wherein the engine has an electrical ignition system and wherein said means for preventing starting of the engine when the treadle is in its raised position comprises a switch connected with the engine ignition system and operable by depression of the treadle to a predetermined position, and further characterized by:

a second switch connected with the engine ignition system and mounted on said handle to be brought to a predetermined position by gripping the handle, the connections of said two switches with the engine ignition system being such that at least one of said switches must be in its said predetermined position to enable the engine to be started and continue to run.

* * * * *